United States Patent
Gunji et al.

(10) Patent No.: US 8,900,376 B2
(45) Date of Patent: Dec. 2, 2014

(54) HEAT-RESISTANT WATER-SOLUBLE FLUX COMPOSITION FOR SOLDERING

(75) Inventors: Yasuhiro Gunji, Tokyo (JP); Toshiaki Takeyama, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 1716 days.

(21) Appl. No.: 11/632,455

(22) PCT Filed: Jul. 15, 2005

(86) PCT No.: PCT/JP2005/013174
§ 371 (c)(1),
(2), (4) Date: Jan. 16, 2007

(87) PCT Pub. No.: WO2006/009118
PCT Pub. Date: Jan. 26, 2006

(65) Prior Publication Data
US 2008/0066830 A1    Mar. 20, 2008

(30) Foreign Application Priority Data

Jul. 21, 2004   (JP) ................................. 2004-212968

(51) Int. Cl.
*B23K 35/34*   (2006.01)
(52) U.S. Cl.
USPC ............................ 148/23; 252/182.2; 528/271
(58) Field of Classification Search
USPC ............ 427/117; 148/23; 252/182.2; 528/271
IPC ................................ B23K 35/34; C08G 18/4227
See application file for complete search history.

(56) References Cited

U.S. PATENT DOCUMENTS 5,736,193 A * 4/1998 Schink et al. ................. 427/117
6,177,541 B1  1/2001 Ikeda et al.

FOREIGN PATENT DOCUMENTS

| EP | 0 381 468 A1 | 8/1990 |
|---|---|---|
| JP | A 49-67994 | 7/1974 |
| JP | A 02-275867 | 11/1990 |
| JP | A 03-018498 | 1/1991 |
| JP | A 03-285971 | 12/1991 |
| JP | A 04-200992 | 7/1992 |
| JP | A 05-008085 | 1/1993 |
| JP | A 10-128577 | 5/1998 |
| JP | A 10-158252 | 6/1998 |

* cited by examiner

*Primary Examiner* — Weiping Zhu
(74) *Attorney, Agent, or Firm* — Oliff PLC

(57) ABSTRACT

There is provided a water-soluble flux composition for soldering which is excellent particularly in heat resistance and flux residues after soldering of which can be easily removed by washing with water or warm water. The flux composition for soldering contains a compound of formula (1):

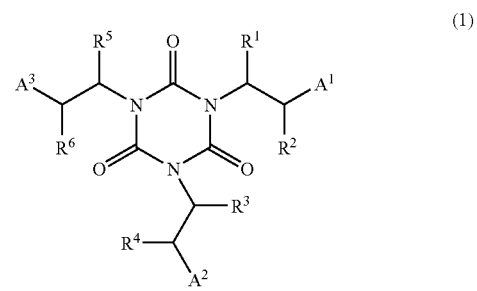

(1)

wherein $R^1$, $R^2$, $R^3$, $R^4$, $R^5$ and $R^6$ independently of one another are a hydrocarbon group or hydrogen atom, and $A^1$, $A^2$ and $A^3$ independently of one another are hydroxy group or an organic group of formula (2):

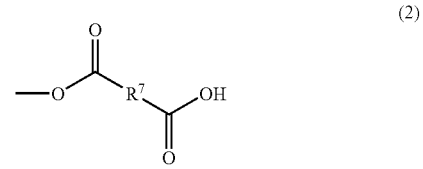

(2)

and at least one of $A^1$, $A^2$ and $A^3$ is an organic group of formula (2).

9 Claims, No Drawings

HEAT-RESISTANT WATER-SOLUBLE FLUX COMPOSITION FOR SOLDERING

TECHNICAL FIELD

The present invention relates to a water-soluble flux composition for soldering which is excellent particularly in heat resistance and flux residues after soldering of which can be easily removed by washing with water or warm water.

BACKGROUND ART

Flux is used in the field of soldering, silver brazing, electric welding and so on to improve soldering by removing oxides on the surface of metal substrates, preventing re-oxidation during heating, or lowering the surface tension of solder to increase wetting property.

The flux is a composition containing a resin, an activator and other additives. Conventionally, flux comprising a rosin as a main ingredient is used in the electric and electronic fields in which flux residues are not washed after soldering. However, when the flux is used for soldering of important security parts such as precision electronic parts, electric equipment for automobile, and so on, flux residues must be removed by washing. Therefore, when a rosin-type flux is used, fluorine-based organic solvents or chlorine-based organic solvents that fully dissolve the rosin have been used for washing after soldering. However, these organic solvents become strictly regulated as they have adverse influence on safety and sanitation, and global environment. Thus, it is desired to minimize the use of them. Consequently, flux compositions that dissolve in water or warm water get a lot of attention for removing flux by washing after soldering.

On the other hand, the metals used for solder itself are also becoming a subject to regulation. Although the metals used for the conventional solder material were mainly tin-lead based ones, much attention is directed to lead-free solder in order to reduce the effects on the environment. Further, in Europe, "Restriction of the use of hazardous substances including lead (RoHS Directive)" will be enforced from July of 2006, and much attention is directed to lead-fee solder also from world point of view. As lead-free solders, tin-silver-copper based, tin-silver based ones, and so on are known, but they have a higher melting point by 20 to 30° C. than the conventional tin-lead based one. Therefore, also for the flux composition used in soldering, heat resistance is required, it is desired to develop flux compositions having heat resistance together with the above-mentioned water soluble property.

A flux composition for soldering containing a polyester polycarboxylic acid synthesized from an esterification reaction of a polyol with a polycarboxylic acid is disclosed as a flux for reducing soldering defects. The polyol includes ethylene glycol, several epoxy resins, and the polycarboxylic acid includes (anhydrous) succinic acid, (anhydrous) phthalic acid, and the like (Patent Document 1).

A flux composition for solder in which at least one of vinyl group-containing compounds, carboxyl group-containing compounds, and epoxy group-containing compounds, and a modified amine compound obtained by a reaction of an amine compound having active hydrogen are used as flux base resins is disclosed. The carboxyl group-containing compounds include acetic acid, citric acid, and the like, the amine compound having active hydrogen includes n-propylamine, ethylene diamine, and the like. The modified amine compound is a compound obtained by condensation reaction of an active hydrogen-containing amine compound with a carboxyl group-containing compound. The flux composition containing these modified amine compounds can contain organic acids such as benzoic acid, succinic acid, maleic acid, and the like. (Patent Document 2).

A water soluble flux composition for solder containing a resinous substance being a reaction product of one or two or more carboxyl group-containing compounds selected from the group consisting of monocarboxylic acid, polycarboxylic acid and hydroxycarboxylic acid having carbon atom number of 8 or less, with tris-(2,3-epoxypropyl)-isocyanurate, and an activator is disclosed. The carboxylic acid includes acetic acid, oxalic acid, succinic acid, citric acid, and the like, and the activator includes lactic acid, oleic acid, aniline hydrochloride, ethylene diamine, and the like (Patent Document 3).

Patent Document 1: JP-A-4-200992 (1992) (Claims)
Patent Document 2: JP-A-5-008085 (1993) (Claims)
Patent Document 3: JP-A-3-018498 (1991) (Claims)

DISCLOSURE OF INVENTION

Problem to be Solved by Invention

As the temperature at which solder melts is raised with the tendency to lead-free solder, it becomes required to have a higher heat resistance also for flux used in soldering. Conventionally, there are problems that coloring occurs after soldering due to insufficiency of heat resistance in water soluble flux in the field in which particularly flux residues must be removed by washing after soldering, and that washing property with water or warm water is lowered due to insolubilization. The present invention provides a flux composition that resolves these problems and that has heat resistance and is water soluble.

Means for Solving Problem

As a first aspect, the present invention relates to a flux composition for soldering containing a compound of formula (1):

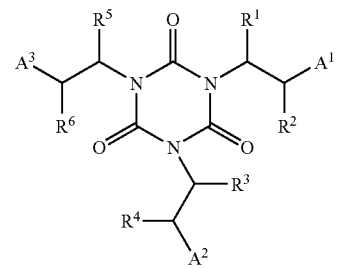

wherein $R^1$, $R^2$, $R^3$, $R^4$, $R^5$ and $R^6$ independently of one another are a hydrocarbon group or hydrogen atom, and $A^1$, $A^2$ and $A^3$ independently of one another are hydroxy group or an organic group of formula (2):

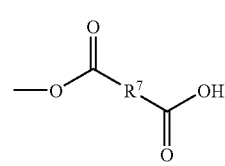

$R^7$ is a divalent $C_{1-12}$ hydrocarbon group, and at least one of $A^1$, $A^2$ and $A^3$ is an organic group of formula (2).

As a second aspect, the present invention relates to the flux composition for soldering as set forth in the first aspect, wherein the compound of formula (1) is a compound obtained by reacting a trivalent alcohol of formula (3):

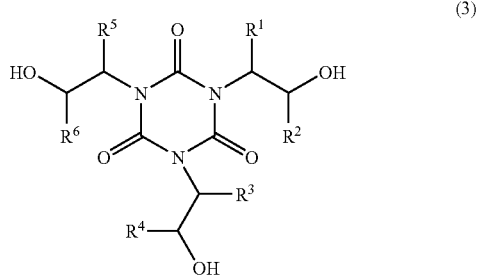

(3)

wherein $R^1$, $R^2$, $R^3$, $R^4$, $R^5$ and $R^6$ independently of one another are a hydrocarbon group or hydrogen atom, with a dicarboxylic acid or an acid anhydride in a molar ratio (the dicarboxylic acid or acid anhydride)/(hydroxy group) of 0.33 to 1.0.

As a third aspect, the present invention relates to a flux composition for soldering containing a compound of formula (4):

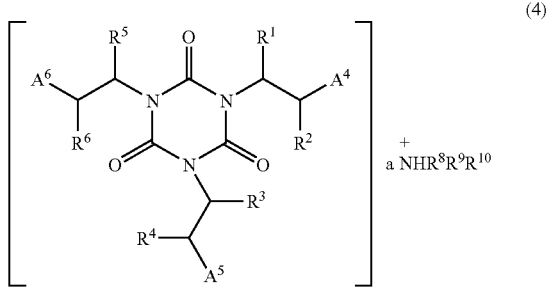

(4)

wherein $R^1$, $R^2$, $R^3$, $R^4$, $R^5$ and $R^6$ independently of one another are a hydrocarbon group or hydrogen atom, $R^8$, $R^9$ and $R^{10}$ independently of one another are hydrogen atom, or a hydrocarbon group, an aromatic ring group, a heterocyclic group, or a derivative thereof, and $A^4$, $A^5$ and $A^6$ independently of one another are hydroxy group or an organic group of formula (5):

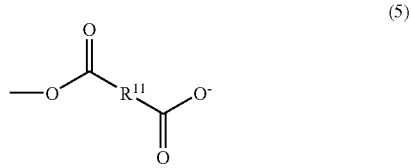

(5)

$R^{11}$ is a divalent $C_{1-12}$ hydrocarbon group, and at least one of $A^4$, $A^5$ and $A^6$ is an organic group of formula (5), a is a number of formula (5) present in formula (4).

As a fourth aspect, the present invention relates to the flux composition for soldering as set forth in the third aspect wherein the compound of formula (4) is a compound obtained by reacting the compound of formula (1) with an amine in a molar ratio (the amine)/(carboxylic add group) of 0.01 to 1.00.

As a fifth aspect, the present invention relates to the flux composition for soldering as set forth in the third aspect, wherein the compound of formula (4) is a compound obtained by reacting the compound of formula (1) with an amine in a molar ratio (the amine)/(carboxylic acid group) of 0.2 to 0.5.

As a sixth aspect, the present invention relates to the flux composition for soldering as set forth in any one of the first to fifth aspects, wherein $R^7$ and $R^{11}$ are a straight chain or branched $C_{2-6}$ hydrocarbon groups.

As a seventh aspect, the present invention relates to the flux composition for soldering as set forth in any one of the first to fifth aspects, wherein $R^1$ to $R^6$ are hydrogen atoms, and $R^7$ and $R^{11}$ are $C_2$ hydrocarbon groups.

Effect of Invention

The compound of the present invention does not impair heat resistance even when it is used as a flux composition for soldering to solder at a high temperature accompanied with lead-free solder, and it is water-soluble, and thus it is very useful as particularly heat-resistant water-soluble soldering flux composition for lead-free solder.

BEST MODE FOR CARRYING OUT THE INVENTION

The present invention relates to a flux composition for soldering containing a compound of formula (1). In formula (1), $R^1$, $R^2$, $R^3$, $R^4$, $R^5$ and $R^6$ independently of one another are a hydrocarbon group or hydrogen atom. The hydrocarbon group includes an aliphatic hydrocarbon or aromatic hydrocarbon group. The aliphatic hydrocarbon group includes a straight-chain or branched $C_{1-6}$ hydrocarbon group such as methyl group, ethyl group, propyl group, isopropyl group, pentyl group, octyl group or the like. In addition, the aromatic hydrocarbon atom includes substituted or unsubstituted $C_{6-16}$ aromatic hydrocarbon group such as phenyl group, benzyl group, tolyl group, naphthyl group or the like.

$A^1$, $A^2$ and $A^3$ independently of one another are hydroxy group or an organic group of formula (2), and at least one of $A^1$, $A^2$ and $A^3$ is an organic group of formula (2).

In the compound of formula (1), the moieties of $A^1$, $A^2$ and $A^3$ can be the organic group of formula (2), and the compound having 1, 2 or 3 organic groups of formula (2) in the molecule of formula (1) can be used. Each of the compounds having 1, 2 or 3 organic groups of formula (2) in the molecule of formula (1) can be used alone or in a mixture thereof.

In the organic group of formula (2), $R^7$ may be a divalent $C_{1-12}$ aliphatic hydrocarbon group or a divalent aromatic hydrocarbon group. The divalent aliphatic hydrocarbon group includes for example methylene group, ethylene group, propylene group or the like, and the divalent aromatic hydrocarbon group includes phenylene group, methylphenylene group, naphthylene group or the like.

The compound of formula (1) can be produced by reacting a trivalent alcohol of formula (3) with a dicarboxylic acid or an acid anhydride.

In the compound of formula (3), $R^1$, $R^2$, $R^3$, $R^4$, $R^5$ and $R^6$ independently of one another are a hydrocarbon group or hydrogen atom, and the hydrocarbon group is the same as that exemplified for formula (1).

For example when the compound of formula (3) is tris(2-hydroxyalkyl)-isocyanurate, it can be obtained by an addition reaction of an alkylene oxide on cyanuric acid. For example, in case where tris(2-hydroxyethyl)isocyanurate is produced, after addition of cyanuric acid, ethylene oxide, 2-methoxy ethanol and triphenylethyl phosphonium bromide in an autoclave, the atmosphere therein was replaced with nitrogen, the autoclave is immediately dipped in an oil bath heated to 127° C. with stirring, and the reaction was carried out under self-vapor pressure for 14 hours after the internal temperature of the autoclave reaches 120° C. After the completion of the reaction, the reaction product is transferred in an egg-plant flask equipped with a thermometer, and the solvent is distilled off with a vacuum evaporator. Finally, the solvent was distilled off at 130° C./666.61 Pa or less for 30 minutes to obtain tris(2-hydroxyethyl)isocyanurate in powdery state.

The dicarboxylic acid and acid anhydride used in the production of the compound of formula (1) include succinic acid, succinic anhydride, maleic acid, maleic anhydride, phthalic acid, phthalic anhydride, hexahydrophthalic anhydride, tetrahydrophthalic anhydride, methyltetrahydrophthalic anhydride, methylhexahydrophthalic anhydride, trimellitic acid, trimellitic anhydride, methylnadic acid, methylnadic anhydride, dodecyl succinic anhydride, itaconic acid, itaconic anhydride or the like. These compounds can be used alone or in a mixture of two or more.

In the production process of polyester polycarboxylic acid of formula (1) in which a trivalent alcohol of formula (3) is reacted with a dicarboxylic acid or an acid anhydride, the solvent may be any solvent so long as it is inert with the reaction, examples of the representative solvents are ketones such as acetone, methyl ethyl ketone, etc., nitriles such as acetonitrile, etc., ethers such as tetrahydrofuran, dioxane, etc., esters such as ethyl acetate, etc., aromatic hydrocarbons such as chlorobenzene, toluene, etc., halogenated hydrocarbons such as chloroform, dichloroethane, etc., or a mixture thereof. In these solvents, a trivalent alcohol of formula (3) and a dicarboxylic acid or an acid anhydride are dissolved, and if necessary as a catalyst, tertiary amines such as triethyl amine, tripropyl amine, etc., quaternary phosphonium salts such as halogenated triphenyl monoalkyl phosphoniums represented by triphenylethyl phosphonium bromide, etc., quaternary ammonium salts such as halogenated tetraalkyl ammonium represented by tetraethylammonium bromide, etc., are used, and the reaction is continued at the reflux temperature of the solvent until the carboxylic acid content titrated with 0.1 M sodium hydroxide aqueous solution reaches a theoretical value.

In the synthesis of polyester polycarboxylic acid of formula (1), when the trivalent alcohol of formula (3) and the dicarboxylic acid or the acid anhydride that are raw materials are used in a molar ratio so that the trivalent alcohol of formula (3) is in excess, the polyester polycarboxylic acid on which hydroxy groups remain is synthesized. The flux composition for soldering containing the polyester polycarboxylic acid is advantageous in terms of aqueous solubility. However, when a large number of hydroxy groups are present on the molecule, heat resistance is lowered, and the hydroxy groups cause the formation of oligomers or polymers that become the factors causing insolubility. The trivalent alcohol and the dicarboxylic acid or the acid anhydride can be used in a molar ratio of (dicarboxylic acid or acid anhydride)/(hydroxy group)=0.1 to 1.0, preferably 0.33 to 1.0, more preferably 0.33 to 0.8. If the proportion is too low, in case where the polyester polycarboxylic acid is crystalline, crystals tent do be separated out during storage. On the other hand, if it is too high, water solubility is lowered. When the reaction is carried out in a proportion of (dicarboxylic acid or acid anhydride)/(hydroxy group)=0.33 to 0.8, each of a compound having one organic group of formula (2), a compound having two organic groups of formula (2) and a compound having three organic groups of formula (2) in $A^1$, $A^2$ and $A^3$ in formula (1) are produced alone, or a mixture thereof is produced. Both compounds that are produced alone or in a mixture can be utilized as the compound of formula (1) used in the present invention.

In the present invention, in order to further improve heat resistance and water solubility, the compound of formula (4) can be used for the flux composition for soldering.

In the compound of formula (4), $R^1$, $R^2$, $R^3$, $R^4$, $R^5$ and $R^6$ independently of one another are a hydrocarbon group or hydrogen atom, and $R^1$, $R^2$, $R^3$, $R^4$, $R^5$ and $R^6$ may be groups exemplified for the above-mentioned formula (1). In addition, $R^8$, $R^9$ and $R^{10}$ independently of one another are hydrogen atom, or a hydrocarbon group, an aromatic ring group, a heterocyclic group, or a derivative thereof, and include $C_{1-18}$ hydrocarbon group, $C_{1-18}$ aromatic ring group, and $C_{1-18}$ heterocyclic group, and these $R^8$, $R^9$ and $R^{10}$ correspond to the hydrogen atom of an amine or the above-mentioned organic group when the compound of formula (4) is synthesized by reacting the compound of formula (1) with the amine.

In $R^8$, $R^9$ and $R^{10}$, the hydrocarbon group, the aromatic ring group and the heterocyclic group include substituted or unsubstituted forms. In addition, the derivative thereof means an organic group in which these groups are incorporated as a constituent, and includes an organic group derived from ethoxy group or ethylol group corresponding to the hydrocarbon group (for example ethyl group), from benzyl group or brominated benzyl group corresponding to the aromatic ring group (for example phenyl group), or from melamine or benzoguanamine corresponding to heterocyclic group having nitrogen atom as a hetero atom (for example triazine ring), and so on.

In addition, $A^4$, $A^5$ and $A^6$ independently of one another are hydroxy group or an organic group of formula (5), and at least one of $A^4$, $A^5$ and $A^6$ is an organic group of formula (5). The value of a is identical with the number of formula (5) present in formula (4).

In formula (5), $R^{11}$ is the same organic group as the above-mentioned $R^7$. That is, a divalent $C_{1-12}$ aliphatic hydrocarbon group or a divalent aromatic hydrocarbon group can be exemplified. The divalent aliphatic hydrocarbon group includes for example methylene group, ethylene group, propylene group or the like, and the divalent aromatic hydrocarbon group includes phenylene group, methylphenylene group, naphthylene group or the like.

The compound of formula (4) is an ammonium salt. The compound of formula (4) is an ammonium salt obtained by reacting the compound of formula (1) with an amine.

The amine used in the above-mentioned reaction includes primary amines, secondary amines and tertiary amines, and is for example primary amines such as 2-methylbenzyl amine, 3-methylbenzyl amine, 4-methylbenzyl amine, n-butyl amine, n-decyl amine, 2,2-diphenylethyl amine, methoxyethyl amine, aniline, melamine, acetoguanamine (2,4-diamino-6-methyl-1,3,5-triazine), benzoguanamine (2,4-diamino-6-phenyl-1,3,5-triazine), etc., secondary amines such as N-butylbenzyl amine, dicyclohexyl amine, di-2-ethylhexyl amine, di-n-hexyl amine, dipentyl amine, dibenzyl amine, bis(2-methoxyethyl)amine, N-methyl aniline, morpholine, piperidine, imidazole, 2-methylimidazole, benzimidazole, triazole, etc., tertiary amines such as triethanol amine, N-methyldibutyl amine, N-methyldiphenyl amine, triisopropanol amine, tri-n-butyl amine, tribenzyl amine, triethylene tetraimine, triisopentyl amine, tri-n-pentyl amine, N,N-dimethyl-n-dodecyl amine, N,N-dimethyloctyl amine, tri-n-octyl amine, pyridine, pyrimidine, N-methylimidazole, etc.

In the production of the compound of formula (4), the compound of formula (1) and amine are reacted in a molar ratio of (amine)/(carboxyl group) ranging from 0.01 to 1.00, preferably from 0.2 to 0.5. If the amount of the amine to be reacted is too small, the effect of the amine salt is low, while if it is too large, the amine component is often phase-separated, therefore these cases are not preferable.

Hereinafter, the synthesis method of the cases wherein $R^7$ and $R^{11}$ are straight-chain or branched $C_{2-6}$ hydrocarbon groups, particularly the case wherein $R^1$ to $R^6$ are hydrogen atoms and $R^7$ and $R^{11}$ are $C_2$ hydrocarbon groups is explained.

In a 4-neck round-bottomed reaction flask equipped with a thermometer and a condenser, tris(2-hydroxyethyl)isocyanurate and succinic anhydride are dissolved in acetonitrile and triethyl amine is added as a catalyst, and the flask is dipped in an oil bath at 85° C. and stirred. After the temperature reached the reflux temperature, the reaction was carried out for 2 hours, then acetonitrile was distilled off with a vacuum evaporator. The resulting liquid product was subjected to recrystallization in ethyl acetate to obtain crystal corresponding to the compound of formula (1).

The compound of formula (4) corresponding to the amine salt of polyester polycarboxylic acid can be easily produced by reacting the compound of formula (1) with an amine in an alcohol such as methanol. For example, me production of the triethanol amine salt of the succinic anhydride addition product (acid content 5.33 eq/kg) of tris(2-hydroxyethyl)isocyanurate in the above-mentioned example is carried out as follows. A succinic anhydride addition product of tris(2-hydroxyethyl) isocyanurate and methanol were dissolved by placing them in a 4-neck round-bottomed reaction flask equipped with a thermometer and a condenser, dipping the flask in an oil bath at 70° C. and stirring. Thereafter triethanol amine was added dropwise, methanol was distilled off with a vacuum evaporator immediately after the completion of the addition dropwise to obtain a liquid product.

An activator and a solvent for controlling viscosity can be added in the flux composition of the present invention.

The activator includes for example carboxylic acids such as sebacic acid, citric acid, tartaric acid, adipic acid, sorbic acid or the like, or amines such as triethanol amine or the like.

The flux composition of the present invention can be used as such, and can be used after subjecting to viscosity-control by diluting suitably with a solvent. The solvent for dilution may be water, or an aqueous solvent such as 1,2-butane diol, 1,4-butane diol, propylene glycol, ethylene glycol and so on. The addition amount thereof may be an amount to be diluted to a desired viscosity, and is generally 20 to 50% by weight.

EXAMPLES

Synthetic Example 1

Synthesis of tris(2-hydroxyethyl)isocyanurate (Reaction Product A)

In an autoclave, 38.7 g (0.3 mol) of cyanuric acid, 39.6 g (0.9 mol) of ethylene oxide, 150 g of 2-methoxy ethanol and 0.53 g of triphenylethyl phosphonium bromide were added, then the atmosphere therein was replaced with nitrogen, the autoclave is immediately dipped in an oil bath heated to 127° C. with stirring, and the reaction was carried out under self-vapor pressure for 14 hours after the internal temperature of the autoclave reaches 120° C. After the completion of the reaction, the reaction product is transferred in an egg-plant flask equipped with a thermometer, and the solvent is distilled off with a vacuum evaporator. Finally, the solvent was distilled off at 130° C./666.61 Pa or less for 30 minutes to obtain 77.5 g of tris(2-hydroxyethyl)isocyanurate in powdery state.

Synthetic Example 2

Synthesis of tris(2-hydroxypropyl)isocyanurate (Reaction Product B)

In an autoclave, 129 g (1.0 mol) of cyanuric acid, 177 g (3.05 mol) of propylene oxide, 129 g of 2-methoxy ethanol, 1.29 g of triphenylethyl phosphonium bromide and 1.29 g of 35% hydrochloric acid were added, then the atmosphere therein was replaced with nitrogen, the autoclave is immediately dipped in an oil bath heated to 127° C. with stirring, and the reaction was carried out under self-vapor pressure for 20 hours after the internal temperature of the autoclave reaches 120° C. After the completion of the reaction, the reaction product is transferred in an egg-plant flask equipped with a thermometer, and the solvent is distilled off with a vacuum evaporator. Finally, the solvent was distilled off at 110° C./666.61 Pa or less for 60 minutes to obtain 302 g of tris(2-hydroxypropyl)isocyanurate in powdery state.

Synthetic Example 3

Synthesis of succinic anhydride Addition Product (Reaction Product C) of tris(2-hydroxyethyl)isocyanurate In a 1 L 4-neck round-bottomed reaction flask equipped with a thermometer and a condenser, 100 g (0.383 mol) of tris(2-hydroxyethyl)isocyanurate synthesized in Synthetic Example 1, 113.7 g (1.137 mol) of succinic anhydride, 2 g of triethyl amine and 400 g of acetonitrile were placed, and the flask was dipped in an oil bath at 85° C. and stirred. The molar ratio of (succinic anhydride)/(hydroxy group) was 0.989. After the temperature reached the reflux temperature, the reaction was carried out for 2 hours, then acetonitrile was distilled off with a vacuum evaporator. The resulting liquid product was subjected to recrystallization in ethyl acetate to obtain 203 g of a crystal having a melting point of 108° C. The resulting crystal had an acid content of 5.33 eq/kg that almost corresponds to the theoretical acid content of 5.35 eq/kg. The HPLC analysis also showed single 3-addition product peak Synthetic Example 4

Synthesis of succinic anhydride Addition Product (Reaction Product D) of tris(2-hydroxyethyl)isocyanurate In a 1 L 4-neck round-bottomed reaction flask equipped with a thermometer and a condenser, 100 g (0.383 mol) of tris(2-hydroxyethyl)isocyanurate synthesized in Synthetic Example 1, 78.5 g (0.765 mol) of succinic anhydride, 2 g of triethyl amine and 400 g of acetonitrile were placed, and the flask was dipped in an oil bath at 85° C. and stirred. The molar ratio of (succinic anhydride)/(hydroxy group) was 0.661. After the temperature reached the reflux temperature, the reaction was carried out for 2 hours, then acetonitrile was distilled off with a vacuum evaporator. 175 g of the resulting product had an acid content of 4.24 eq/kg that almost corresponds to the theoretical acid content of 4.32 eq/kg. The HPLC analysis showed a proportion of 3-addition product: 2-addition product: 1-addition product: 0-addition product of 34:45:17:4.

Synthetic Example 5

Synthesis of Maleic Anhydride Addition Product (Reaction Product E) of tris(2-hydroxyethyl)isocyanurate In a 1 L 4-neck round-bottomed reaction flask equipped with a thermometer and a condenser, 100 g (0.383 mol) of tris(2-hydroxyethyl)isocyanurate synthesized in Synthetic Example 1, 112.7 g (1.150 mol) of maleic anhydride, 2 g of triethyl amine and 400 g of acetonitrile were placed, and the flask was dipped in an oil bath at 85° C. and stirred. The molar ratio of (maleic anhydride)/(hydroxy group) was 1.00. After the temperature reached the reflux temperature, the reaction was carried out for 2 hours, then acetonitrile was distilled off with a vacuum evaporator. The resulting liquid product was subjected to recrystallization in ethyl acetate to obtain a wax product. 111 g of the resulting product had an acid content of 5.35 eq/kg that almost corresponds to the theoretical acid content of 5.41 eq/kg. The HPLC analysis also showed single 3-addition product peak.

Synthetic Example 6

Synthesis of ammonium salt (Reaction Product F) by Reaction of succinic anhydride Addition Product of tris(2-hydroxyethyl)isocyanurate with triethanol amine In a 200 cc 4-neck round-bottomed reaction flask equipped with a thermometer and a condenser, 15 g (carboxylic acid equivalent: 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 4 g (0.027 eq) of triethanol amine was added dropwise. The molar ratio of (triethanol amine)/(carboxylic acid group) was 0.3375. Immediately after the completion of the addition dropwise, methanol was distilled off with a vacuum evaporator to obtain 19 g of a liquid product.

Synthetic Example 7

Synthesis of ammonium salt (Reaction Product G) by Reaction of succinic anhydride Addition Product of tris(2-hydroxyethyl)isocyanurate with triethanol amine In a 200 cc 4-neck round-bottomed reaction flask equipped with a thermometer and a condenser, 15 g (carboxylic acid equivalent: 0.064 eq) of the succinic anhydride addition product (Reaction product D) of tris(2-hydroxyethyl)isocyanurate synthesized in Synthetic Example 4 and 70 cc of methanol were placed, and the flask was dipped in an oil bath at 70° C. and stirred, and thereby the content was dissolved. Then, 3.2 g (0.021 eq) of triethanol amine was added dropwise. The molar ratio of (triethanol amine)/(carboxylic acid group) was 0.328. Immediately after the completion of the addition dropwise, methanol was distilled off with a vacuum evaporator to obtain 18.2 g of a liquid product.

Synthetic Example 8

Synthesis of ammonium salt (Reaction Product H) by Reaction of succinic anhydride Addition Product of tris(2-hydroxyethyl)isocyanurate with N,N-dimethyl-dodecyl amine In a 200 cc 4-neck round-bottomed reaction flask equipped with a thermometer and a condenser, 15 g (carboxylic acid equivalent: 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 5.77 g (0.027 eq) of N,N-dimethyl-n-dodecyl amine was added dropwise. The molar ratio of (N,N-dimethyl-n-dodecyl amine)/(carboxylic acid group) was 0.3375. Immediately after the completion of the addition dropwise, methanol was distilled off with a vacuum evaporator to obtain 20.7 g of a liquid product.

Synthetic Example 9

Synthesis of ammonium salt (Reaction Product I) by Reaction of succinic anhydride Addition Product of tris(2-hydroxyethyl)isocyanurate with n-butyl amine In a 200 cc 4-neck round-bottomed reaction flask equipped with a thermometer and a condenser, 15 g (carboxylic acid equivalent: 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 2 g (0.027 eq) of n-butyl amine was added dropwise. The molar ratio of (n-butyl amine)/(carboxylic acid group) was 0.3375. Immediately after the completion of the addition dropwise, methanol was distilled off with a vacuum evaporator to obtain 17 g of a liquid products Synthetic Example 10

Synthesis of ammonium salt (Reaction Product J) by Reaction of succinic anhydride Addition Product of tris(2-hydroxyethyl)isocyanurate with dicyclohexyl amine In a 200 cc 4-neck round-bottomed reaction flask equipped with a thermometer and a condenser, 15 g (carboxylic acid equivalent: 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 4.9 g (0.027 eq) of dicyclohexyl amine was added dropwise. The molar ratio of (dicyclohexyl amine)/(carboxylic acid group) was 0.3375. Immediately after the completion of the addition dropwise, methanol was distilled off with a vacuum evaporator to obtain 17 g of a liquid product.

Synthetic Example 11

Synthesis of succinic anhydride Addition Product (Reaction Product K) of tris(2-hydroxypropyl)isocyanurate In a 1 L 4-neck round-bottomed reaction flask equipped with a thermometer and a condenser, 100 g (0.383 mol) of tris(2-hydroxypropyl)isocyanurate synthesized in Synthetic Example 2, 113.7 g (1.137 mol of succinic anhydride, 2 g of triethyl amine and 400 g of acetonitrile were placed, and the flask was dipped in an oil bath at 85° C. and stirred. The molar ratio of (succinic anhydride)/(hydroxy group) was 0.989. After the temperature reached the reflux temperature, the reaction was carried out for 2 hours, then acetonitrile was distilled off with a vacuum evaporator. The resulting liquid product was subjected to recrystallization in ethyl acetate to obtain 203 g of a crystal having a melting point of 108° C. The resulting crystal had an acid content of 5.33 eq/kg that almost corresponds to the theoretical acid content of 5.35 eq/kg. The HPLC analysis also showed single 3-addition product peak.

Synthetic Example 12

Synthesis of ammonium salt (Reaction Product L) by Reaction of succinic anhydride Addition Product of tris(2-hydroxypropyl)isocyanurate with triethanol amine In a 200 cc 4-neck round-bottomed reaction flask equipped with a thermometer and a condenser, 15 g (carboxylic acid equivalent 0.084 eq) of the succinic anhydride addition product (Reaction product K) of tris(2-hydroxypropyl)isocyanurate synthesized in Synthetic Example 11 and 70 cc of methanol were placed, and the flask was dipped in an oil bath at 70° C. and stirred, and thereby the content was dissolved. Then, 4.2 g (0.028 eq) of triethanol amine was added dropwise. The molar ratio of (triethanol amine)/(carboxylic add group) was 0.333. Immediately after the completion of the addition dropwise, methanol was distilled off with a vacuum evaporator to obtain 19.1 g of a liquid product.

Synthetic Example 13

Synthesis of succinic anhydride Addition Product (Reaction Product M) of pentaerythritol In a 1 L 4-neck round-bottomed reaction flask equipped with a thermometer and a condenser, 60 g (hydroxy group equivalent: 1.76 eq) of pentaerythritol (reagent), 176.0 g (carboxylic acid equivalent: 1.76 eq) of succinic anhydride, 1.2 g of triethyl amine and 500 g of acetonitrile were placed, and the flask was dipped in an oil bath at 85° C. and stirred. The molar ratio of (succinic anhydride)/(hydroxy group) was 1.00. After the temperature reached the reflux temperature, the reaction was carried out for 2 hours, then acetonitrile was distilled off with a vacuum evaporator. The resulting liquid product was subjected to recrystallization in ethyl acetate to obtain 235 g of a crystal having a melting point of 138° C. The resulting crystal had an acid content of 7.37 eq/kg that almost corresponds to the theoretical acid content of 7.45 eq/kg. The HPLC analysis also showed single peak.

Synthetic Example 14

Synthesis of ammonium salt (Reaction Product N) by Reaction of succinic anhydride Addition Product of pentaerythritol with N,N-dimethyl-n-dodecy amine In a 200 cc 4-neck round-bottomed reaction flask equipped with a thermometer and a condenser, 15 g (carboxylic acid equivalent 0.11 eq) of the succinic anhydride addition product (Reaction product M) of pentaerythritol synthesized in Synthetic Example 13 and 70 cc of methanol were placed, and the flask was dipped in an oil bath at 70° C. and stirred, and thereby the content was dissolved. Then, 5.77 g (0.028 eq) of N,N-dimethyl-dodecy amine was added dropwise. The molar ratio of (N,N-dimethyl-n-dodecy amine)/(carboxylic acid group) was 0-254. Immediately after the completion of the addition dropwise, methanol was distilled off with a vacuum evaporator to obtain 20.5 g of a liquid product

Synthetic Example 15

Synthesis of succinic anhydride Addition Product (Reaction Product O) of triglycidyl isocyanurate In a 1 L 4-neck round-bottomed reaction flask equipped with a thermometer and a condenser, 100 g (glycidyl group equivalent: 1.00 eq) of triglycidyl isocyanurate, 118 g (carboxylic acid equivalent 2.00 eq) of succinic acid, 0.5 g of triphenyl phosphine and 100 g of toluene were placed, and the flask was dipped in an oil bath at 120° C. and stirred. After the content was dissolved and the temperature reached the reflux temperature, the reaction was carried out for 2 hours. However, the product was in a state of gel.

Synthetic Example 16

Synthesis of ammonium salt (Reaction Product P) by Reaction of maleic acid with N,N-dimethyl-n-dodecy amine In a 200 cc 4-neck round-bottomed reaction flask equipped with a thermometer and a condenser, 15 g (carboxylic acid equivalent: 0258 eq) of maleic add (reagent) and 70 cc of methanol were placed, and the flask was dipped in an oil bath at 70° C. and stirred, and thereby the content was dissolved. Then, 27.6 (0.129 eq) of N,N-dimethyl-n-dodecy amine was added dropwise. The molar ratio of (N,N-dimethyl-n-dodecy amine)/(carboxylic acid group) was 0.500. Immediately after the completion of the addition dropwise, methanol was distilled off with a vacuum evaporator to obtain 42.5 g of a crystal having a melting point of 70° C.

Synthetic Example 17

Synthesis of ammonium salt (Reaction Product Q) by Reaction of adipic acid with N,N-dimethyl-dodecy amine In a 200 cc 4-neck round-bottomed reaction flask equipped with a thermometer and a condenser, 15 g (carboxylic acid equivalent: 0.206 eq) of adipic acid (reagent) and 70 cc of methanol were placed, and the flask was dipped in an oil bath at 70° C. and stirred, and thereby the content was dissolved. Then, 21.9 g (0.103 eq) of N,N-dimethyl-n-dodecy amine was added dropwise. The molar ratio of (N,N-dimethyl-n-dodecy amine)/(carboxylic acid group) was 0.500. Immediately after the completion of the addition dropwise, methanol was distilled off with a vacuum evaporator to obtain 38.7 g of a liquid product.

Synthetic Example 18

Synthesis of pyridinium salt (Reaction Product R) by Reaction of succinic anhydride Addition Product of tris(2-hydroxyethyl)isocyanurate with pyridine In a 200 cc 4-neck round-bottomed reaction flask equipped with a thermometer and a condenser 15 g (carboxylic acid equivalent 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 2.1 g (0.027 eq) of pyridine was added dropwise. The molar ratio of (pyridine)/(carboxylic acid group) was 0.3375. Immediately after the completion of the addition dropwise, methanol was distilled off with a vacuum evaporator to obtain 17 g of a liquid product Synthetic Example 19

Synthesis of imidazolinium salt (Reaction Product S) by Reaction of succinic anhydride Addition Product of tris(2-hydroxyethyl)isocyanurate with 2-methylimidazole In a 200 cc 4-neck round-bottomed reaction flask equipped with a thermometer and a condenser, 15 g (carboxylic acid equivalent 0.08 eq) of the succinic anhydride addition product (Reaction product C) of tris(2-hydroxyethyl)isocyanurate synthesized in Synthetic Example 3 and 70 cc of methanol were placed, and the flask was dipped in an oil bath at 70° C. and stirred, and thereby the content was dissolved. Then, 2.2 g (0.027 eq) of 2-methylimidazole was added dropwise. The molar ratio of (2-methylimidazole)/(carboxylic acid group) was 0.3375. Immediately after the completion of the addition dropwise, methanol was distilled off with a vacuum evaporator to obtain 172 g of a liquid product.

The product (main agent) C, D, E, F, G, H, I, J, K, L, R or S was mixed with a solvent (1,2-butanediol), and the resulting compositions were subjected to tests as flux compositions of Examples according to the present invention.

In addition, the product (main agent) M, N, O, P or Q was mixed with a solvent, and the resulting compositions were subjected to tests as flux compositions of Comparative Examples according to the present invention.

Example 1

70% by weight of Reaction product C and 30% by weight of 1,2-butanediol were mixed to obtain a flux composition. The composition had a viscosity of 8000 mPa·s at 25° C. measured by E-type viscometer.

Example 2

70% by weight of Reaction product D and 30% by weight of 1,2-butanediol were mixed to obtain a flux composition. The composition had a viscosity of 6500 mPa·s at 25° C. measured by E-type viscometer Example 3

70% by weight of Reaction product E and 30% by weight of 1,2-butanediol were mixed to obtain a flux composition. The composition had a viscosity of 7500 mPa·s at 25° C. measured by E-type viscometer.

Example 4

80% by weight of Reaction product F and 20% by weight of 1,2-butanediol were mixed to obtain a flux composition. The composition had a viscosity of 30000 mPa·s at 25° C. measured by E-type viscometer.

Example 5

80% by weight of Reaction product G and 20% by weight of 1,2-butanediol were mixed to obtain a flux composition. The composition had a viscosity of 2500 mPa·s at 25° C. measured by E-type viscometer.

Example 6

80% by weight of Reaction product H and 20% by weight of 1,2-butanediol were mixed to obtain a flux composition. The composition had a viscosity of 2500 mPa·s at 25° C. measured by E-type viscometer.

Example 7

80% by weight of Reaction product I and 20% by weight of 1,2-butanediol were mixed to obtain a flux composition. The composition had a viscosity of 30000 mPa·s at 25° C. measured by E-type viscometer.

Example 8

80% by weight of Reaction product J and 20% by weight of 1,2-butanediol were mixed to obtain a flux composition. The composition had a viscosity of 30000 mPa·s at 25° C. measured by E-type viscometer.

Example 9

70% by weight of Reaction product K and 30% by weight of 1,2-butanediol were mixed to obtain a flux composition. The composition had a viscosity of 3000 mPa·s at 25° C. measured by E-type viscometer.

Example 10

80% by weight of Reaction product L and 20% by weight of 1,2-butanediol were mixed to obtain a flux composition. The composition had a viscosity of 9000 mPa·s at 25° C. measured by E-type viscometer.

Example 11

70% by weight of Reaction product R and 30% by weight of 1,2-butanediol were mixed to obtain a flux composition. The composition had a viscosity of 2100 mPa·s at 25° C. measured by E-type viscometer.

Example 12

70% by weight of Reaction product S and 30% by weight of 1,2-butanediol were mixed to obtain a flux composition. The composition had a viscosity of 2700 mPa·s at 25° C. measured by E-type viscometer.

Comparative Example 1

70% by weight of Reaction product M and 30% by weight of 1,2-butanediol were mixed to obtain a flux composition. The composition had a viscosity of 8500 mPa·s at 25° C. measured by E-type viscometer.

Comparative Example 2

80% by weight of Reaction product N and 20% by weight of 1,2-butanediol were mixed to obtain a flux composition. The composition had a viscosity of 4000 mPa·s at 25° C. measured by E-type viscometer.

Comparative Example 3

It was tried to obtain a flux composition by mixing 80% by weight of Reaction product O and 20% by weight of 1,2-butanediol. However, Reaction product O was in a state of gel, and thereby was not dissolved.

Comparative Example 4

Although 80% by weight of Reaction product P and 20% by weight of 1,2-butanediol were dissolved at 70° C. to obtain a flux composition, crystal was separated out on standing at room temperature for 1 hour. The composition had a viscosity of 70 mPa·s at 25° C. measured by E-type viscometer that was a low viscosity as a flux base resin.

Comparative Example 5

Although 80% by weight of Reaction product Q and 20% by weight of 1,2-butanediol were dissolved to obtain a flux composition. The composition had a viscosity of 200 mPa·s at 25° C. measured by E-type viscometer that was a low viscosity as a flux base resin.

Test Method

A flux composition was placed in a sealed container and stored at room temperature for 1 month, and the viscosity after 1 month-storage was measured by E-type viscometer (shelf stability test).

In addition, a copper foil on which 0.3 g of a solder (HEXSOL No. 67 manufactured by HAKKO Corporation) and 0.1 g of a flux composition were put was placed on a hot plate heated at 260° C. The copper foil was taken out at 1 minute after melting of the solder, and any difference in color of the flux composition between before and after heating was visually observed (yellowing test).

Then, the copper foil was entirely dipped in warm water at 50° C., and taken out 3 minutes later, and subjected to visual observation on whether or not there are flux residues on the copper foil (water washing test)

(Evaluation)

1) Shelf Stability Test

A flux composition was placed in a sealed container and stored at room temperature for 1 month, and the viscosity after 1 month-storage was measured by E-type viscometer.

◎: No change compared with pre-storage, ○: Slight increase in viscosity, Δ: Increase in viscosity, x: Separation out of main agent.

2) Yellowing Test

A copper foil on which 0.3 g of a solder (HEXSOL No. 67 manufactured by HAKKO Corporation) and 0.1 g of a flux composition were put was placed on a hot plate heated at 260° C. The copper foil was taken out at 1 minute after melting of the solder, and any difference in color of the flux composition between before and after heating was visually observed:

◎: No change at all (colorless and transparent), ○: Pale yellow and transparent, Δ: Yellowing, x: Brown.

3) Water Washing Test

After heating at 260° C. for 1 minute, the copper foil was entirely dipped in warm water at 50° C., and taken out 3 minutes later, and subjected to visual observation on whether or not there are flux residues on the copper Foil:

◎: No residue remains at all, ○: Slight tackiness remains, Δ: Tackiness remains, x: Water-insoluble material remains.

TABLE 1

|  | Shelf Stability Test | Yellowing Test | Water Washing Test |
| --- | --- | --- | --- |
| Example 1 | ○ | ◎ | ○ |
| Example 2 | ◎ | ◎ | ◎ |
| Example 3 | ◎ | ○ | ○ |
| Example 4 | ◎ | ◎ | ◎ |
| Example 5 | ◎ | ◎ | ◎ |
| Example 6 | ◎ | ◎ | ◎ |
| Example 7 | ◎ | ◎ | ◎ |
| Example 8 | ◎ | ◎ | ◎ |
| Example 9 | ○ | ◎ | ◎ |
| Example 10 | ◎ | ◎ | ◎ |
| Example 11 | ◎ | ○ | ◎ |
| Example 12 | ◎ | ◎ | ◎ |
| Comparative Example 1 | X | Δ | Δ |
| Comparative Example 2 | ○ | Δ | X |
| Comparative Example 3 | No measurement | No measurement | No measurement |
| Comparative Example 4 | X | X | X |
| Comparative Example 5 | ○ | X | X |

The flux compositions of Examples 1 to 12 were excellent in shelf stability, and the results of the yellowing test and water washing test in which these flux compositions were used were good.

The flux composition containing a succinic anhydride addition product of pentaerythritol in Comparative Example 1 was not sufficient in shelf stability, and the results of the yellowing test and water washing test in which these flux compositions were used were not sufficient.

The flux composition containing an ammonium salt by reaction of succinic anhydride addition product of pentaerythritol with N,N-dimethyl-n-dodecyl amine in Comparative Example 2 was good in shelf stability, but the results of the yellowing test and water washing test in which these flux compositions were used were not sufficient.

In Comparative Example 3, the product obtained by reacting triglycidyl isocyanurate with succinic acid became gel, therefore no flux composition could be obtained. In case of the flux composition containing an ammonium salt by reaction of maleic acid with N,N-dimethyl-n-dodecyl amine in Comparative Example 4, a crystal separated out at room temperature, and when the composition was heated at 260° C., it decomposed and vaporized, then carbides remained, and was insoluble in warm water at 50° C.

The flux composition containing an ammonium salt by reaction of adipic acid with N,N-dimethyl-n-dodecyl amine in Comparative Example 5 was sufficient in shelf stability, but when the composition was heated at 260° C., it decomposed and vaporized, then carbides remained, and was insoluble in warm water at 50° C.

The flux composition containing a polyester polycarboxylic acid compound according to the present invention showed no change even at a high temperature of 260° C., and therefore was excellent in heat resistance, and further easily dissolved in warm water. In addition, it became clear that an ammonium salt obtained by reacting the above-mentioned compound with an amine led to a further increase in the effects.

INDUSTRIAL APPLICABILITY

The compound used in the present invention can be utilized as particularly a heat-resistant water-soluble soldering flux composition because the heat resistance thereof is not vitiated by a soldering at a high temperature accompanied with lead-free solder, and it is water-soluble.

The invention claimed is:

1. A flux composition for soldering containing a compound of formula (4):

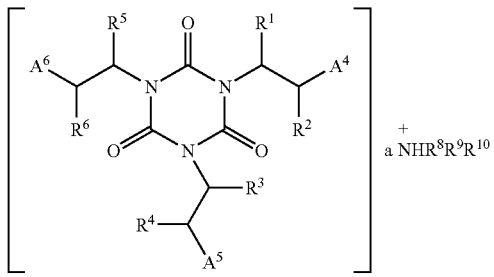

wherein $R^1$, $R^2$, $R^3$, $R^4$, $R^5$ and $R^6$ independently of one another are a hydrocarbon group or hydrogen atom, $R^8$, $R^9$ and $R^{10}$ independently of one another are hydrogen atom, or a hydrocarbon group, an aromatic ring group, a heterocyclic group, or a derivative thereof, and $A^4$, $A^5$ and $A^6$ independently of one another are hydroxy group or an organic group of formula (5):

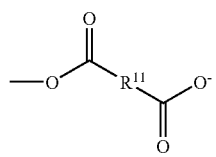

wherein $R^{11}$ is a divalent $C_{1-12}$ hydrocarbon group, and at least one of $A^4$, $A^5$ and $A^6$ is an organic group of formula (5), a is a number of formula (5) present in formula (4).

2. The flux composition for soldering according to claim 1, wherein the compound of formula (4) is a compound obtained by reacting a compound of formula (1):

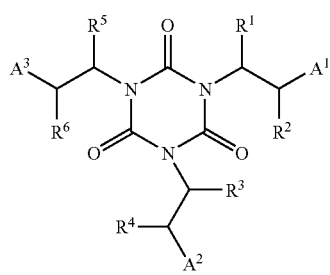

wherein $R^1$, $R^2$, $R^3$, $R^4$, $R^5$ and $R^6$ independently of one another are a hydrocarbon group or hydrogen atom, and $A^1$, $A^2$ and $A^3$ independently of one another are hydroxy group or an organic group of formula (2):

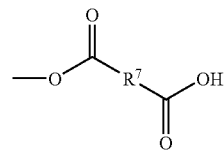

$R^7$ is a divalent $C_{1-12}$ hydrocarbon group, and at least one of $A^1$, $A^2$ and $A^3$ is an organic group of formula (2), with an amine in a molar ratio (the amine)/(carboxylic acid group) of 0.01 to 1.00.

3. The flux composition for soldering according to claim 1, wherein the compound of formula (4) is a compound obtained by reacting a compound of formula (1):

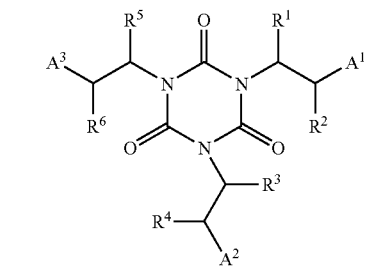

wherein $R^1$, $R^2$, $R^3$, $R^4$, $R^5$ and $R^6$ independently of one another are a hydrocarbon group or hydrogen atom, and $A^1$, $A^2$ and $A^3$ independently of one another are hydroxy group or an organic group of formula (2):

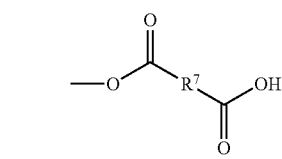

$R^7$ is a divalent $C_{1-12}$ hydrocarbon group, and at least one of $A^1$, $A^2$ and $A^3$ is an organic group of formula (2), with an amine in a molar ratio (the amine)/(carboxylic acid group) of 0.2 to 0.5.

4. The flux composition for soldering according to claim 1, wherein $R^{11}$ is a straight-chain or branched $C_{2-6}$ hydrocarbon groups.

5. The flux composition for soldering according to claim 2, wherein $R^7$ and $R^{11}$ are a straight-chain or branched $C_{2-6}$ hydrocarbon groups.

6. The flux composition for soldering according to claim 3, wherein $R^7$ and $R^{11}$ are a straight-chain or branched $C_{2-6}$ hydrocarbon groups.

7. The flux composition for soldering according to claim 1, wherein $R^1$ to $R^6$ are hydrogen atoms, and $R^{11}$ is $C_2$ hydrocarbon groups.

8. The flux composition for soldering according to claim 2, wherein $R^1$ to $R^6$ are hydrogen atoms, and $R^7$ and $R^{11}$ are $C_2$ hydrocarbon groups.

9. The flux composition for soldering according to claim 3, wherein $R^1$ to $R^6$ are hydrogen atoms, and $R^7$ and $R^{11}$ are $C_2$ hydrocarbon groups.

* * * * *